C. C. WILLIAMS.
AUTOMOBILE JACK.
APPLICATION FILED JUNE 10, 1913.

1,137,684.

Patented Apr. 27, 1915.
2 SHEETS—SHEET 1.

Witnesses
Hugh H. Ott
V. B. Hillyard

Inventor
C. C. Williams
By Victor J. Evans
Attorney

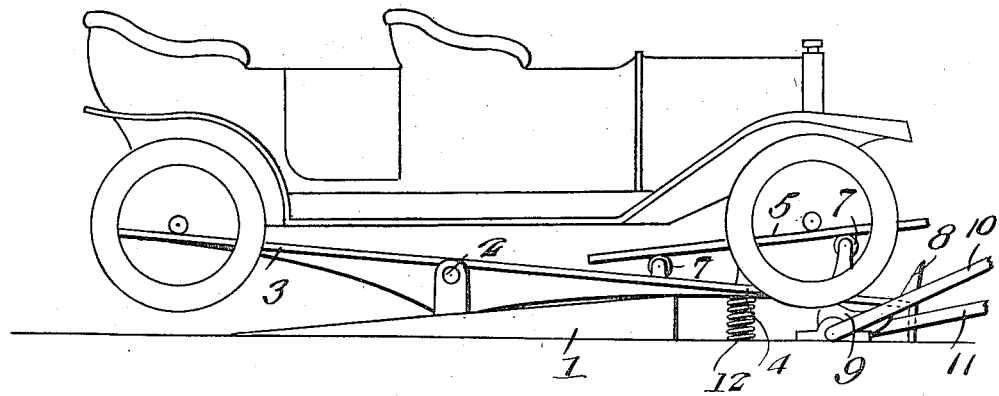
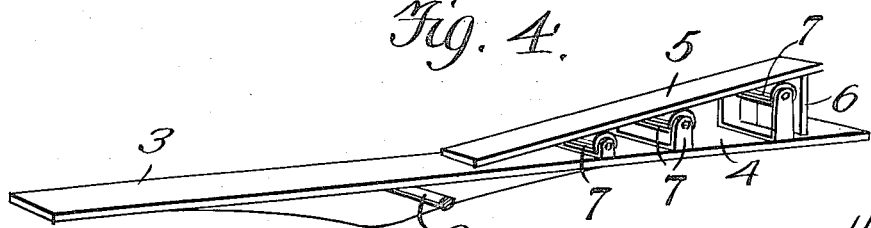
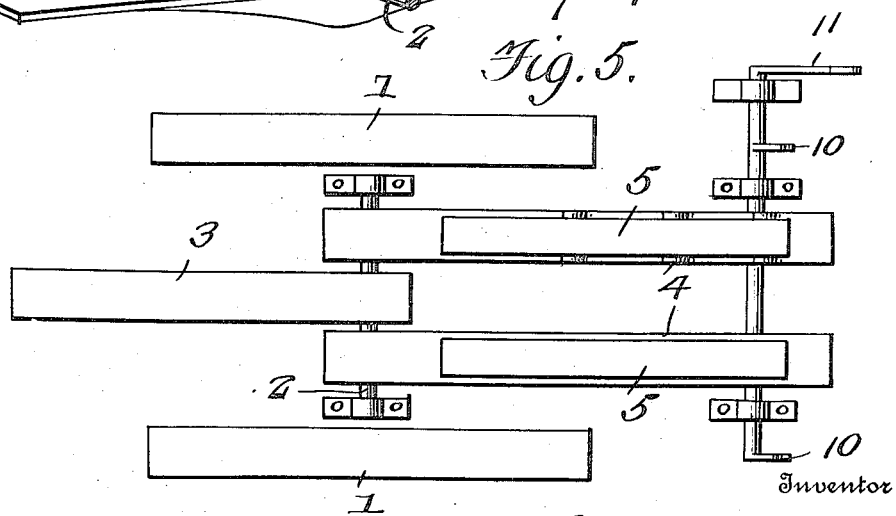

UNITED STATES PATENT OFFICE.

CHARLES C. WILLIAMS, OF FINDLAY, OHIO.

AUTOMOBILE-JACK.

1,137,684.  Specification of Letters Patent.  Patented Apr. 27, 1915.

Application filed June 10, 1913. Serial No. 772,880.

*To all whom it may concern:*

Be it known that I, CHARLES C. WILLIAMS, a citizen of the United States, residing at Findlay, in the county of Hancock and State of Ohio, have invented new and useful Improvements in Automobile-Jacks, of which the following is a specification.

The primary intention of the present invention is the provision of means for automatically elevating an automobile, or analogous vehicle, provided with soft tread tires and holding such vehicle in position to relieve the tires of all weight and thereby prevent injury thereto.

The invention provides a tilting frame, inclines for the front wheels of the vehicle to run upon and means coöperating with the tilting frame to hold the latter in position until the vehicle is properly received thereon and trips a support, whereby the tilting frame is released and overbalances and causes the rear wheels to clear the surface, said tilting frame being held in position when tilted by means of a catch, which when released admits of the tilting frame assuming a normal position so that the vehicle may be run over the device.

The invention consists of the novel features, details of construction and combination of parts, which hereinafter will be more particularly set forth, illustrated in the accompanying drawings, and pointed out in the appended claims.

Figure 1:
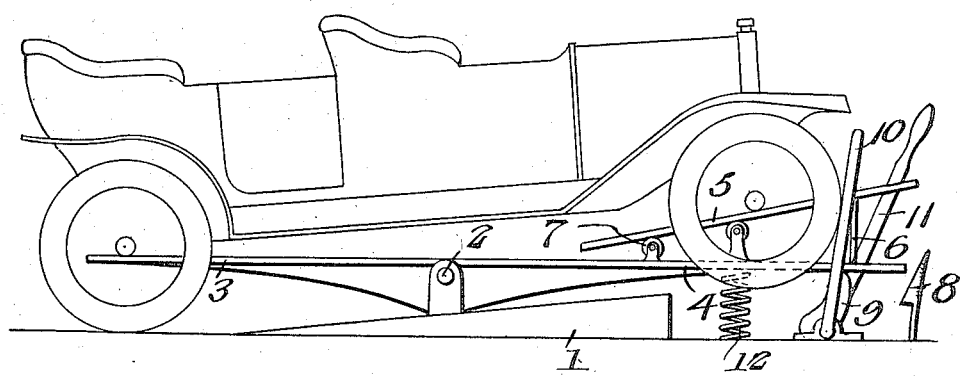
Figure 3:
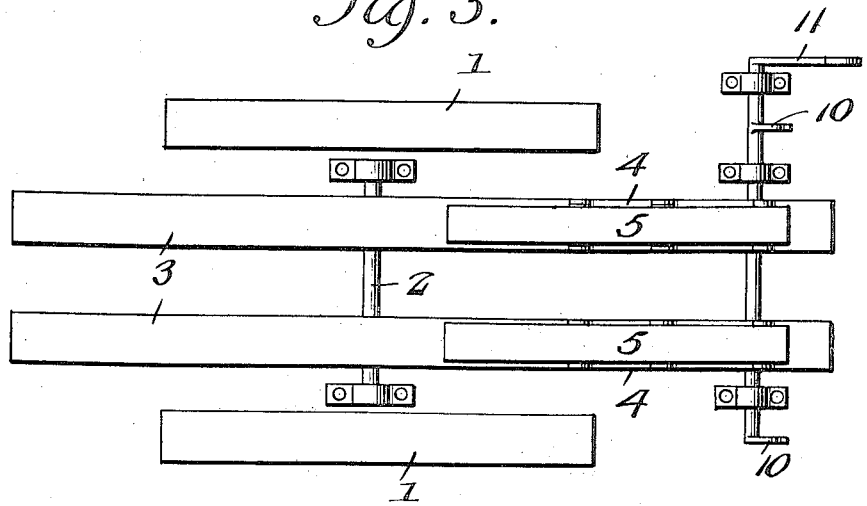

Referring to the drawings, forming a part of the specification, Figure 1 is a side view of the invention, showing an automobile in position just prior to the tripping of the support, whereby the front end of the tilting frame is held elevated. Fig. 2 is a view similar to Fig. 1, showing the position of the parts after the tilting frame has been released and assumes a position with the wheels of the automobile clear of the surface. Fig. 3 is a top plan view. Fig. 4 is a detail view of one of the members of the tilting frame. Fig. 5 is a top plan view of a modification.

Corresponding and like parts are referred to in the following description, and indicated in all the views of the drawings, by the same reference characters.

Two inclines 1 are arranged in position for the front wheels of an automobile or analogous machine or vehicle to run upon. Between the inclines 1 is arranged a tilting frame, which is adapted to have its end portions engage the front and rear axles of the vehicle, said frame being mounted upon a cross piece 2 and of a length to safely engage both axles of the vehicle. The inclines 1 may be of any construction and are designed to support the front wheels of the vehicle when the latter is run upon the device to have all four wheels held clear of the surface. The tilting frame preferably comprises parallel members each comprising a rear portion 3 and a forward portion 4. The upper surface of the forward portion 4 is inclined with reference to the upper surface of the rear part 3. The forward portion of each section 4 comprises a plate 5 and an under structure 6, the latter having a plurality of rollers 7 upon which the plate 5 is mounted, the rollers 7 being arranged to support the plate 5 in a relatively inclined position with reference to the surface of the part 3. When the front wheels clear the inclines 1 the front axle engages the plates 5 and the latter move forward upon the rollers 7, which relieve the friction so that the vehicle or machine may advance with a minimum amount of resistance.

The parts are so arranged that when the vehicle has moved forward upon the tilting frame a distance to bring the rear axle over the rear portion, the tilting frame is released and overbalances by reason of the preponderance of the weight being forward of the cross piece 2, such tilting of the frame lifting the rear wheels off the ground or surface, the frame being held in the tilted position by means of a catch 8. A support 9 is located below the front end of the tilting frame to normally hold the latter in given position. A lever 10 has connection with the support 9 and is arranged to be engaged by the front wheels by means of which the support 9 is tripped. A second lever 11 has connection with the support 9, and admits of elevating the forward portion of the tilting frame after the latter has been disengaged from the catch 8, so that the frame may be returned to normal position when it is required to use the vehicle. The parts are so arranged that but little force is required to be exerted to operate the lever 11 to return the tilting frame to normal position when it is required to run the vehicle thereover.

In some instances the under structure of the vehicle or automobile is such as not to admit of the tilting frame having spaced parallel rear portions, hence the tilting frame may be constructed, as indicated in Fig. 5, in which the rear portion 3 consists of a single member or part, which is arranged centrally of the space formed between the forward portions 4.

When a machine or vehicle having pneumatic or other soft tread tires is required to be housed in such a manner as to hold the tires clear of the ground or surface the vehicle is moved forward with the front wheels running upon the inclines 1, and when such wheels clear the inclines the front axle engages the plates 5 of the tilting frame, said plates advancing and moving freely upon the rollers 7 until the front wheels strike the part 10 which trips the support 9 and admits of the tilting frame turning, with the result that the rear portion of the tilting frame engages the rear axle of the vehicle and the latter moving with the frame lifts the rear wheels clear of the ground, at which time the catch 8 engages over the front portion of the tilting frame and holds the vehicle elevated. When it is required to bring the vehicle into service the part 11 is operated after releasing the catch 8 from the tilting frame to move the latter into normal position, when the vehicle will run down upon the tilting frame by gravitative action, the jack being in position for use when the vehicle is again run thereon.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claims appended hereto.

The tilting frame normally inclines, with its rear resting on the floor, so that the machine may pass thereover when riding upon the inclines.

The parts are such that when the front wheels of the machine clear the inclines and strike the trip 10 the frame will tilt and the rear end thereof come under the rear axle of the machine and lift the same. A buffer 12 cushions the impact and prevents jar.

Having thus described the invention what is claimed as new, is:—

A jack for automobiles comprising a tilting frame including a pair of parallel members, a series of anti-friction supports on the rear portion of each member, an inclined plate reposed on said anti-friction supports, means for engaging said parallel members for holding the same in tilted position, and cushioning means for each of said members.

In testimony whereof I affix my signature in presence of two witnesses.

CHARLES C. WILLIAMS.

Witnesses:
  H. C. MULEY,
  W. EARL ULRICH.